US011188546B2

(12) United States Patent
Xiao et al.

(10) Patent No.: US 11,188,546 B2
(45) Date of Patent: Nov. 30, 2021

(54) PSEUDO REAL TIME COMMUNICATION SYSTEM

(71) Applicant: INTERNATIONAL BUSINESS MACHINES CORPORATION, Armonk, NY (US)

(72) Inventors: Ping Xiao, Chingping (CN); Joe Winchester, Hursley (GB); Jenny Jing He, Chandler's Ford (GB); Adrian Kyte, Broadstone (GB); Cheng Fang Wang, Shangdi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 16/580,040

(22) Filed: Sep. 24, 2019

(65) Prior Publication Data

US 2021/0089544 A1 Mar. 25, 2021

(51) Int. Cl.
*G06F 16/24* (2019.01)
*G06F 16/2457* (2019.01)
*G06F 16/2455* (2019.01)

(52) U.S. Cl.
CPC .... *G06F 16/24578* (2019.01); *G06F 16/2455* (2019.01)

(58) Field of Classification Search
CPC . G06F 16/24578; G06F 16/2455; G06F 16/24
USPC ........................................................ 707/728
See application file for complete search history.

(56) References Cited

U.S. PATENT DOCUMENTS

| | | | |
|---|---|---|---|
| 6,135,776 A | 10/2000 | Erturk et al. | |
| 7,523,082 B2 | 4/2009 | Mohan | |
| 7,890,549 B2 * | 2/2011 | Elad | G06Q 10/10 707/803 |
| 8,369,653 B1 * | 2/2013 | Cohen | G06T 3/40 382/299 |
| 8,407,263 B2 * | 3/2013 | Elad | G06Q 30/02 707/803 |
| 9,753,927 B2 | 9/2017 | Cunico et al. | |
| 9,811,792 B2 * | 11/2017 | Balasubramanian | G06F 8/71 |
| 9,953,279 B1 * | 4/2018 | Hankins | G06Q 10/06 |

(Continued)

FOREIGN PATENT DOCUMENTS

| | | |
|---|---|---|
| CN | 101743567 A | 6/2010 |
| WO | 2019046528 A1 | 3/2019 |

OTHER PUBLICATIONS ip.com, "Contextual Asking and Answering of Questions During a Recorded Training Audio or Video," IP.com Prior Art Database Technical Disclosure, IPCOM000236361D, Apr. 22, 2014, 6 pages.

(Continued)

*Primary Examiner* — Hanh B Thai
(74) *Attorney, Agent, or Firm* — Cantor Colburn LLP; Teddi Maranzano

(57) ABSTRACT

Aspects of the invention include determining artifact data associated with an artifact, segmenting the artifact data into a plurality of portions, associating each portion in the plurality of portions with one or more resources, receiving a query associated with the artifact, determining a candidate resource from the one or more resources based on the query, and initializing a communication session with the candidate resource and a requesting application associated with the query.

14 Claims, 5 Drawing Sheets

(56) References Cited

U.S. PATENT DOCUMENTS

| | | | |
|---|---|---|---|
| 10,318,650 B2* | 6/2019 | Huang | G06F 16/2365 |
| 10,360,215 B1* | 7/2019 | Ciarlini | G06F 16/2465 |
| 10,901,994 B2* | 1/2021 | Said | G06F 16/23 |
| 10,938,828 B1* | 3/2021 | Badawy | H04L 63/20 |
| 10,984,385 B2* | 4/2021 | Xu | G06F 16/248 |
| 2002/0099679 A1 | 7/2002 | Usitalo et al. | |
| 2003/0121046 A1* | 6/2003 | Roy | H04H 60/56 |
| | | | 725/90 |
| 2004/0100494 A1* | 5/2004 | Ragoler | G06F 8/20 |
| | | | 715/745 |
| 2005/0171946 A1* | 8/2005 | Maim | G06F 16/9558 |
| 2006/0147101 A1* | 7/2006 | Zhang | G06T 5/30 |
| | | | 382/131 |
| 2009/0171705 A1* | 7/2009 | Bobak | G06Q 50/188 |
| | | | 705/80 |
| 2009/0235356 A1 | 9/2009 | Jensen et al. | |
| 2010/0161524 A1* | 6/2010 | Amid | G06N 5/022 |
| | | | 706/12 |
| 2010/0234042 A1* | 9/2010 | Chan | H04W 36/22 |
| | | | 455/453 |
| 2012/0078873 A1* | 3/2012 | Ferrucci | G06F 16/3329 |
| | | | 707/708 |
| 2012/0330921 A1* | 12/2012 | Ferrucci | G06N 5/02 |
| | | | 707/706 |
| 2013/0204983 A1* | 8/2013 | Kenkre | G06F 9/50 |
| | | | 709/220 |
| 2014/0075004 A1* | 3/2014 | Van Dusen | H04L 41/04 |
| | | | 709/223 |
| 2014/0123168 A1* | 5/2014 | Reisman | H04L 69/329 |
| | | | 725/25 |
| 2014/0164273 A1* | 6/2014 | Asaimuthu | G06Q 10/06 |
| | | | 705/321 |
| 2014/0280179 A1* | 9/2014 | Coleman | G06F 16/3323 |
| | | | 707/740 |
| 2015/0026241 A1* | 1/2015 | Sebastian | H04L 67/10 |
| | | | 709/203 |
| 2015/0089034 A1* | 3/2015 | Stickle | H04L 41/18 |
| | | | 709/223 |
| 2015/0161276 A1* | 6/2015 | Upstill | G06F 16/24534 |
| | | | 707/708 |
| 2015/0178386 A1* | 6/2015 | Oberkampf | G16H 15/00 |
| | | | 707/749 |
| 2015/0324731 A1* | 11/2015 | Balasubramanian | G06Q 10/063112 |
| | | | 717/102 |
| 2015/0324732 A1* | 11/2015 | Balasubramanian | G06F 8/71 |
| | | | 717/102 |
| 2016/0034260 A1* | 2/2016 | Ristock | G06F 9/453 |
| | | | 717/109 |
| 2016/0049004 A1 | 2/2016 | Mullins et al. | |
| 2016/0179945 A1* | 6/2016 | Lastra Diaz | G06F 16/3334 |
| | | | 707/739 |
| 2016/0335524 A1* | 11/2016 | Bremer | G06T 7/0012 |
| 2016/0352738 A1* | 12/2016 | Burch | G06F 9/5077 |
| 2017/0124254 A1* | 5/2017 | van Rooyen | G16B 50/30 |
| 2017/0161057 A1* | 6/2017 | Khazanchi | G06F 8/71 |
| 2017/0163518 A1* | 6/2017 | Dube | H04L 41/5054 |
| 2017/0235848 A1* | 8/2017 | Van Dusen | G06F 30/20 |
| | | | 705/12 |
| 2017/0344554 A1* | 11/2017 | Ha | G06F 16/248 |
| 2017/0344555 A1* | 11/2017 | Yan | G06Q 50/01 |
| 2017/0344954 A1* | 11/2017 | Xu | G06F 16/248 |
| 2017/0364600 A1* | 12/2017 | Sadauskas, Jr. | G06F 16/248 |
| 2018/0060366 A1* | 3/2018 | Kumar | G06F 16/258 |
| 2018/0107740 A1* | 4/2018 | Galatzer | G06F 8/60 |
| 2018/0239692 A1* | 8/2018 | Kalyanasundram | G06F 11/3696 |
| 2018/0349389 A1* | 12/2018 | Ferrydiansyah | G06Q 10/10 |
| 2019/0102700 A1* | 4/2019 | Babu | G06N 5/025 |
| 2019/0129701 A1* | 5/2019 | Hawrylo | G06F 8/60 |
| 2019/0129712 A1* | 5/2019 | Hawrylo | G06F 11/302 |
| 2019/0130308 A1* | 5/2019 | Chickering | G06N 20/00 |
| 2019/0207966 A1* | 7/2019 | Vashisht | H04L 63/1416 |
| 2019/0207967 A1* | 7/2019 | Vashisht | G06F 16/285 |
| 2019/0340289 A1* | 11/2019 | Said | G06F 16/2465 |
| 2019/0392001 A1* | 12/2019 | Carothers | H04L 67/10 |
| 2020/0259857 A1* | 8/2020 | Tora | G06F 9/541 |
| 2020/0264934 A1* | 8/2020 | Jayaraman | G06F 9/5011 |
| 2020/0265042 A1* | 8/2020 | Beller | G06F 16/93 |
| 2020/0272734 A1* | 8/2020 | Tora | G06N 20/00 |
| 2020/0274894 A1* | 8/2020 | Argoeti | G06F 21/6218 |
| 2020/0285737 A1* | 9/2020 | Kraus | G06F 21/552 |
| 2020/0322873 A1* | 10/2020 | Zachrison | H04W 48/06 |

OTHER PUBLICATIONS ip.com, "Smart Data Collection from Mobile Devices for Instant Speaker-Audience Interaction and Off-line Audience Feedback," IP.com Prior Art Database Disclosure, IPCOM000244207D, Nov. 24, 2015, 12 pages.

* cited by examiner

PSEUDO REAL TIME COMMUNICATION SYSTEM

BACKGROUND

The present invention generally relates to technology assisted group collaborations, and more specifically, to a pseudo real time communication system for offline users.

Technology-assisted group collaborations are now commonplace: many types of tools have been created to support and to expand upon the scope of what can be accomplished between geographically dispersed participants. Some of these tools include, for example, Internet Relay Chat (IRC), message boards, online polls, and collaborative document creation and review. While these tools may represent advances over what existed before, they may nevertheless exhibit certain limitations when used in collaborative efforts involving a large number of people. Often times, demonstrations and presentations can be performed utilizing these collaborative tools. These demonstrations and presentations can be saved for review later by individuals in an offline sense. However, during their review, these individuals may have difficulty obtaining additional information related to the demonstrations and presentations.

SUMMARY

Embodiments of the present invention are directed to a computer-implemented method for providing a pseudo real-time communication session. A non-limiting example of the computer-implemented method includes determining artifact data associated with an artifact, segmenting the artifact data into a plurality of portions, associating each portion in the plurality of portions with one or more resources, receiving a query associated with the artifact, determining a candidate resource from the one or more resources based on the query, and initializing a communication session with the candidate resource and a requesting application associated with the query.

Embodiments of the present invention are directed to a system for providing a pseudo real-time communication session. A non-limiting example of the system includes a processor communicative coupled to a memory, the processor configured to perform determining artifact data associated with an artifact, segmenting the artifact data into a plurality of portions, associating each portion in the plurality of portions with one or more resources, receiving a query associated with the artifact, determining a candidate resource from the one or more resources based on the query, and initializing a communication session with the candidate resource and a requesting application associated with the query.

Embodiments of the invention are directed to a computer program product for providing a pseudo real-time communication session, the computer program product comprising a computer readable storage medium having program instructions embodied therewith. The program instructions are executable by a processor to cause the processor to perform a method. A non-limiting example of the method includes determining artifact data associated with an artifact, segmenting the artifact data into a plurality of portions, associating each portion in the plurality of portions with one or more resources, receiving a query associated with the artifact, determining a candidate resource from the one or more resources based on the query, and initializing a communication session with the candidate resource and a requesting application associated with the query.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide systems and methods for constructing a pseudo-real time communication for an offline audience that are reviewing a recorded lecture, demonstration, or presentation or simply reviewing any accompanying presentation materials such as slides and the like. This pseudo-real time communication allows for an offline individual to transmit feedback or questions directly to one or more individuals associated with the presentation material or the recorded lecture, demonstration, or presentation. For example, a presentation can have multiple contributors that can contribute in a variety of ways including performing the speaking during the presentation while a different individual may have provided the figures or slide materials for the presentation. In some embodiments of the invention, the term artifact can be utilized to refer to lectures, demonstrations, presentations, and associated materials such as slides, figures, and the like.

Given the rise of online and collaborative tools, individuals are working together and sharing information and ideas that are often recorded in the forms of audio and video which can later be downloaded and reviewed by individuals that did not participate in the online session. Also, lectures, presentations, and demonstrations (all referred to herein as simply "presentations") are typically audio or video recorded with accompanying visual materials (slides, figures, etc.) and utilized later as learning aides or references. Many times, these presentations have a number of individuals involved that may have contributed to some or all of the presentation and presentation materials. As described above, individuals who later review these presentations offline may have questions or require more information associated with the presentation. Contemporary systems for viewing offline presentations do not provide a way for an offline presentation audience member to connect with one or more appropriate contributors to the presentation.

Figure 1:
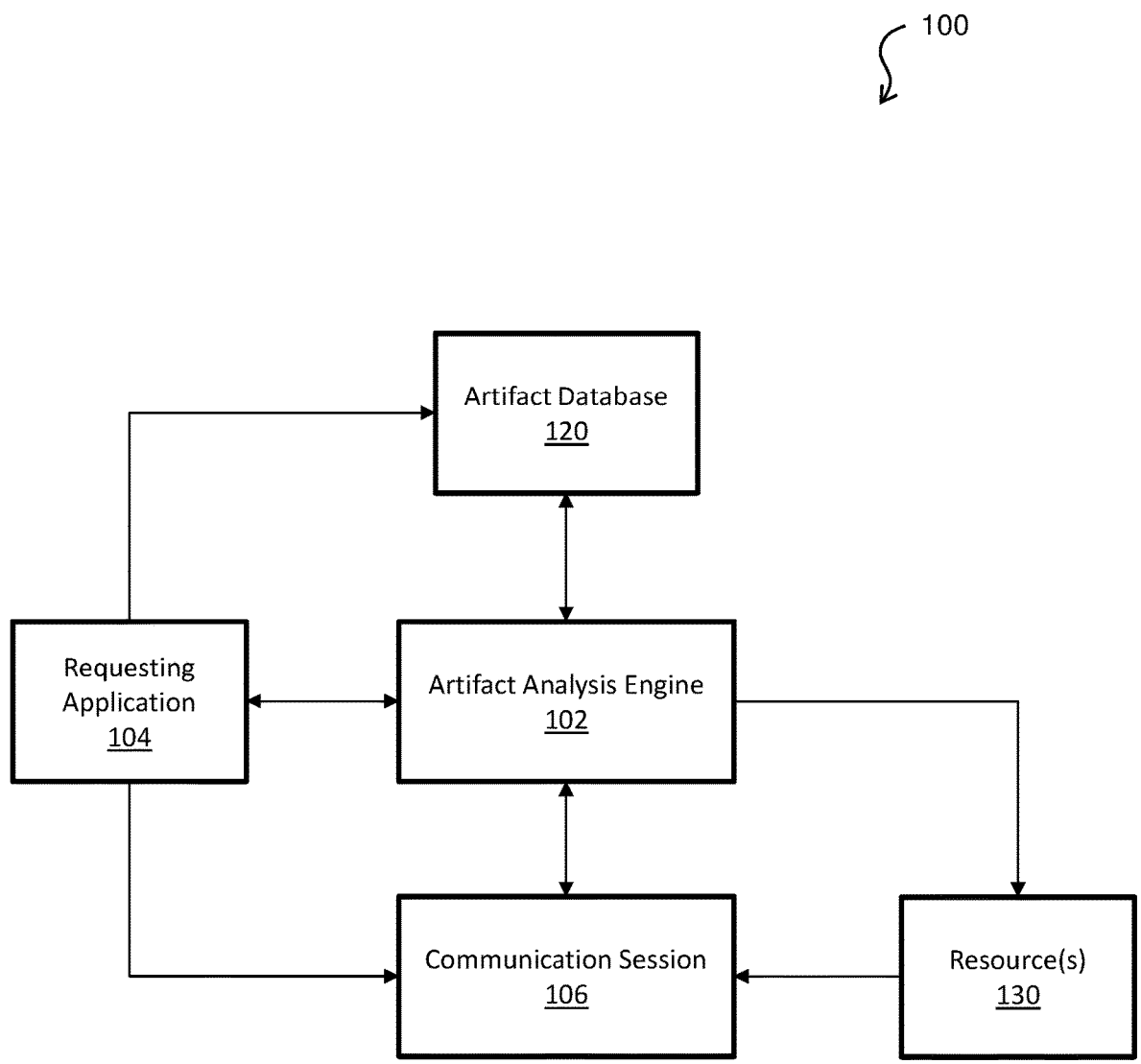
FIG. 1 depicts a system for pseudo real time communication in accordance with one or more embodiments of the present invention.

One or more embodiments of the present invention address one or more of the above-described shortcomings of the prior art by providing a pseudo real time communication system that connects a resource associated with a presentation to an individual reviewing the presentation to answer questions. Turning now to FIG. 1, a system for pseudo real time communication is shown in accordance with one or more embodiments of the present invention. The system 100 includes an artifact analysis engine 102. For ease of description, the term "artifact" can refer to any presentation, lecture, technical document, video or audio recording, structured or unstructured text, and any other related materials (slides, figures, graphs, etc.). In one or more embodiments of the invention, the system 100 also includes an artifact database 120 which can store a number of artifacts for access by a requesting application 104. In one or more embodiments of the invention, the requesting application 104 can be a user utilizing an online portal or any other application providing access to the artifact database 120 and the artifact analysis engine, for example. As described briefly above, the system 100 provides a mechanism for a user to review artifacts and then be able to provide a query (e.g., ask questions or request additional information) for the artifact. This can be completed by a user, through a requesting application 104, accessing artifacts from the artifact database 120. In some embodiments of the invention, the artifact analysis engine 102 can perform natural language processing (NLP) and any other data processing on the artifacts to determine concepts associated with the artifacts in the artifact database 120. In addition, the artifact analysis engine 102 can identify resources for different parts of the artifact. For example, in a presentation artifact that includes video data, audio data, and accompanying slides, the artifact analysis engine 102 can identify individuals that created, presented, and commented on each part of the artifact. In one or more embodiments of the invention, the artifact analysis engine 102 can segment the presentation artifact into a number of portions and then calculate a contribution score for each portion of the presentation artifact according to data that is collected during the creation, presentation, and commenting on the artifact. The portions of the presentation artifact can be segmented by slide or by time frame in the video/audio data or any other segmenting means. The contribution score is calculated for each resource and then a resource is associated with each portion of the presentation artifact based on the contribution score. In some embodiments, multiple resources can be associated with the different portions of the presentation artifact and ranked according to the contribution score. In some embodiments of the invention, additional information about the resource can be utilized to determine the contribution score such as, for example, educational background, field of study, publication history, and the like. For example, if the presentation slide was created by a first presenter about a topic that a second presenter is much more familiar with based on the second presenter's background, the contribution score can be higher for the second presenter despite the fact that the first presenter created and presented on the presentation slide.

In one or more embodiments of the invention, the segmenting of an artifact can be performed by the artifact analysis engine 102 utilizing lexical analysis of the text (or transcribed text from any audio data). This is sometimes referred to as tokenization. By tokenizing the text of the artifact (e.g., transcripts, slides, etc.), the artifact analysis engine 102 can separate the artifact into portions that have certain concepts or themes associated with each portion. This allows for the artifact analysis engine 102 to match concepts extracted from a query from a user and match to a specific portion of the artifact. When the specific portion is identified, the artifact analysis engine 102 can then identify one or more resources 130 associated with said portion and connect the user to the resource.

In one or more embodiments of the invention, the requesting application 104 can submit a query while viewing an artifact. The query can be sent to the artifact analysis engine 102. The artifact analysis engine 102 can analyze the query language and extract concepts, terms, etc. to determine the subject of the query and determine how to respond to the query. Any text processing means can be utilized including, but not limited to, NLP. Based on the query, the artifact analysis engine 102 obtains one or more resources and presents the resource to the requesting application 104 either directly or through a communication session 106.

In one or more embodiments of the invention, the artifact analysis engine 102 can respond to the request or question from the requesting application 104 by analyzing the artifact database 120 to determine whether the query can be handled by the analysis engine 102. For example, if a user sends a query regarding a presentation and accompanying slides, the artifact analysis engine 102 can analyze the query to determine one or more concepts associated with the question. The artifact analysis engine 102 can utilize natural language processing (NLP) to analyze this query and extract concepts and/or understand what is being requested in the question. Once determined, the artifact analysis engine 102 can datamine the artifact database and the artifact itself to determine if the question (or similar questions) have been asked and answered or the question might be answered later in the presentation. So if a user of the requesting application 104 is asking for a definition of a term introduced in an early slide of a presentation. The artifact analysis engine 102, utilizing NLP or any other suitable mechanism, can analyze the later slides or additional presentations to find if the term is defined and present that resource (e.g., answer) to the user through the requesting application 104.

In one or more embodiments of the invention, the requesting application 104 can send in a query that is not readily resolvable by analyzing the artifact database 120. In this scenario, the artifact analysis engine 102 can establish a communication session 106 between the requesting application 104 and one or more resources 130. The communication session 106 can be an application operating on a computing system or hosted on a server system. Any queries can be forwarded, through the communication session 106, to a resource 130 which can be utilized to respond to the request. The resource(s) 130 can be a contributor to the artifact, an author, a presenter, and the like. Also, a resource 130 can be a question and answer session, a chat transcript, and the like, as described above.

In one or more embodiments, in addition to a contribution score, the artifact analysis engine 102 can determine an availability score for a resource prior to establishing the communication session 106 between the user and the resource 130. The availability score can be determined from information about the resource 130 such that the user can have an understanding of how quickly the resource and respond to a query that is forwarded in the communication session 106. For example, if a first resource (e.g., a professor who presented) is on vacation according to his or her calendar, but a graduate student that also presented but has a lower score is available now, the availability score can be presented to the user who made the query. In this case, the user can then select the more available resource despite having a lower contribution score so that the user's query can be responded to more expediently.

Figure 4:
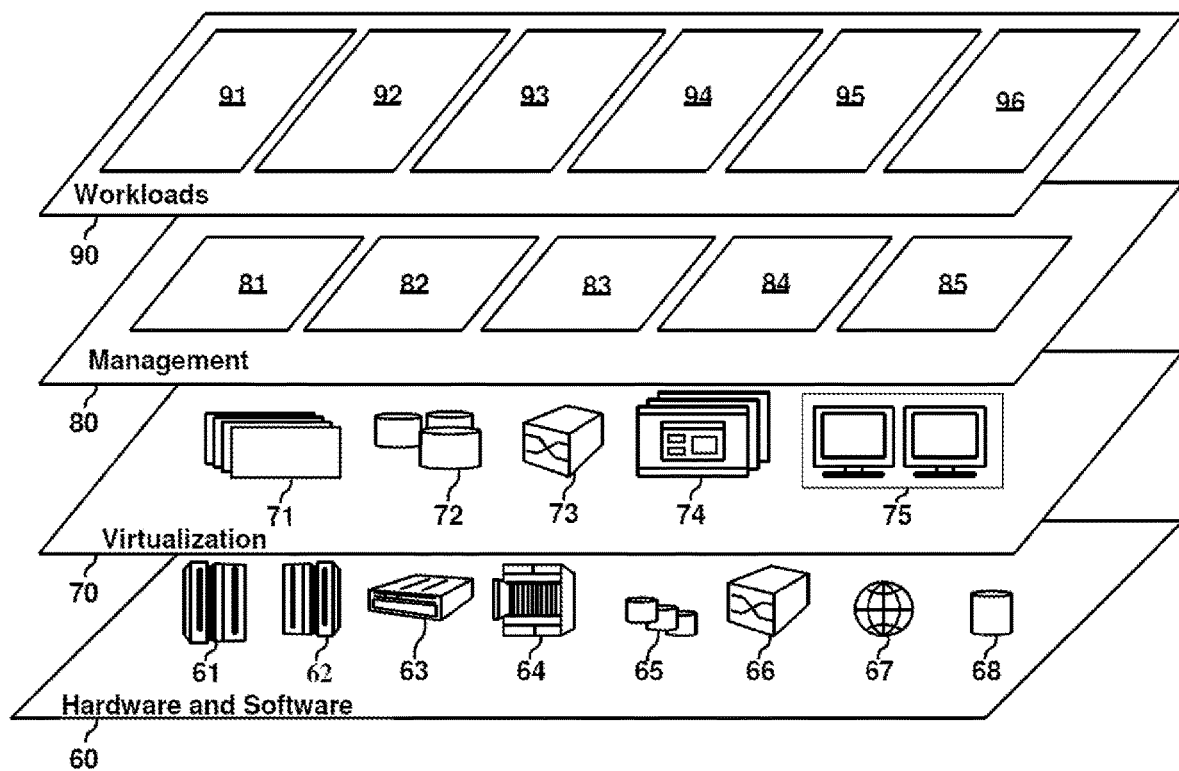
FIG. 4 depicts abstraction model layers according to one or more embodiments of the present invention.
Figure 5:
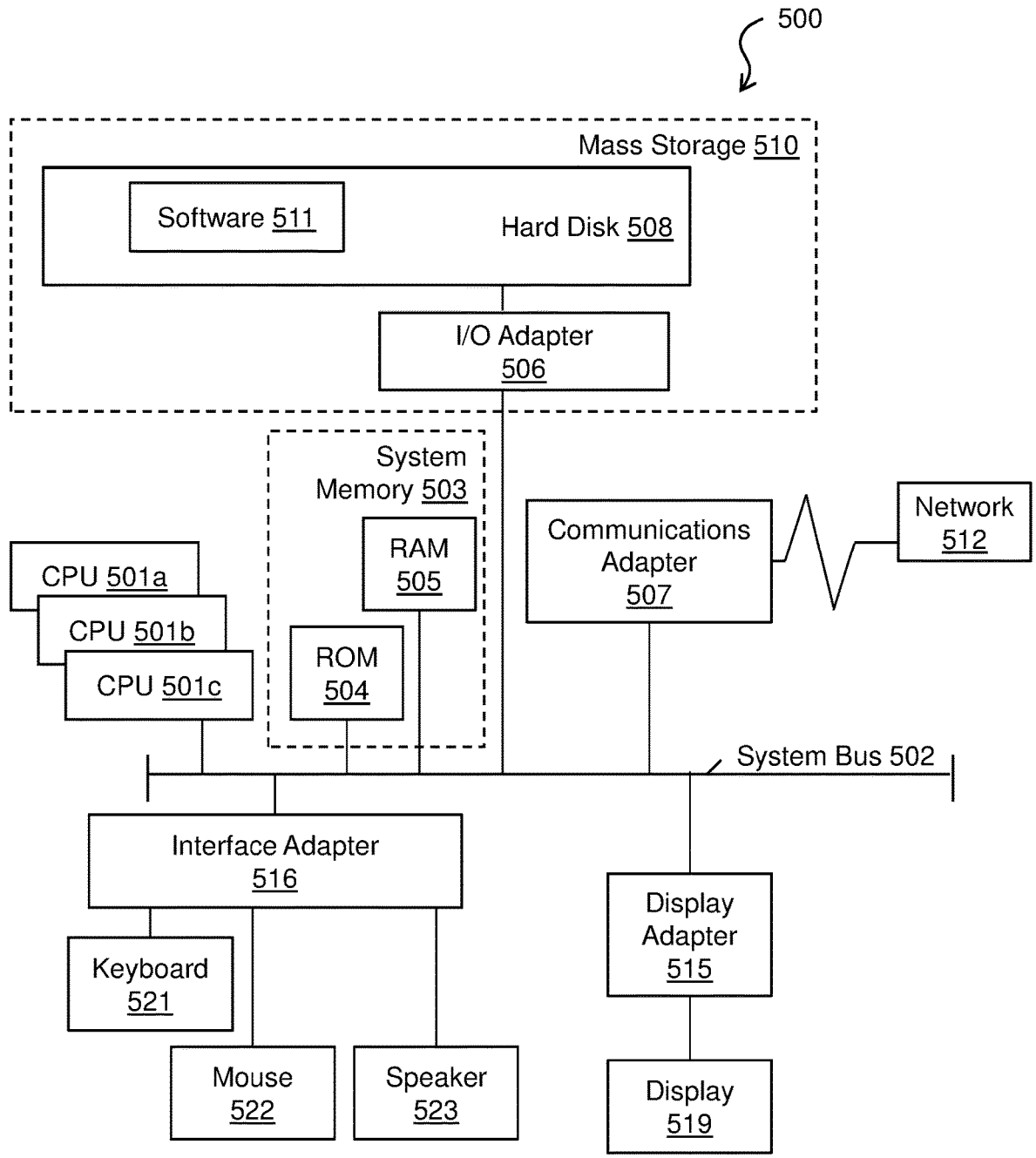
FIG. 5 depicts a block diagram of a computer system for use in implementing one or more embodiments of the present invention.

In one or more embodiments of the invention, the artifact analysis engine 102 can be implemented on the processing system 500 found in FIG. 5. Additionally, the cloud computing system 50 can be in wired or wireless electronic communication with one or all of the elements of the system 100. Cloud 50 can supplement, support or replace some or all of the functionality of the elements of the system 400. Additionally, some or all of the functionality of the elements of system 400 can be implemented as a node 10 (shown in FIGS. 3 and 4) of cloud 50. Cloud computing node 10 is only one example of a suitable cloud computing node and is not intended to suggest any limitation as to the scope of use or functionality of embodiments of the invention described herein.

In one or more embodiments of the invention, the artifact analysis engine 102 can utilize speaker diarization and speech to text (STT) to translate, transcribe, and partition the artifact data (e.g., text, slides, audio, etc.). Speaker diarization can be utilized for speech recognition and to identify speakers in artifact data. Speaker diarization is the process of partitioning an input audio stream into homogeneous segments according to the speaker identity. It can enhance the readability of an automatic speech transcription by structuring the audio stream into speaker turns and providing the speaker's true identity. It is used to answer the question "who spoke when?" Speaker diarization is a combination of speaker segmentation and speaker clustering. The first aims at finding speaker change points in an audio stream. The second aims at grouping together speech segments on the basis of speaker characteristics. Speaker diarization partitions audio data into segments and associates a speaker identity with each segment. For example, for an audio conversation with two speakers, speaker diarization can identify a speaker 1 (S1) and a speaker 2 (S2) and associate the partitioned segments with either S1 or S2 based on who is speaking at the time. This can be utilized to match speakers during a presentation, for example, with associated presentation materials such as slides or figures. The speaker identity can assist with associating contributors to the artifact and assist with the artifact analysis engine 102 matching a user query with an appropriate resource.

In one or more embodiments of the invention, once the audio data is segmented and the speakers identified by speaker diarization, STT can translate the audio data into text. STT can include segmented sections of the audio and associated it with the speaker when translating to the text. For example, the text can be a set of segments including sentences, words, or phrases and the segments can be associated with a speaker next to the text for differentiation. The artifact analysis engine 102 can analyze the artifact by parsing, syntactical analysis, morphological analysis, and other processes including statistical modeling and statistical analysis. The type of NLP analysis can vary by language and other considerations.

Figure 2:
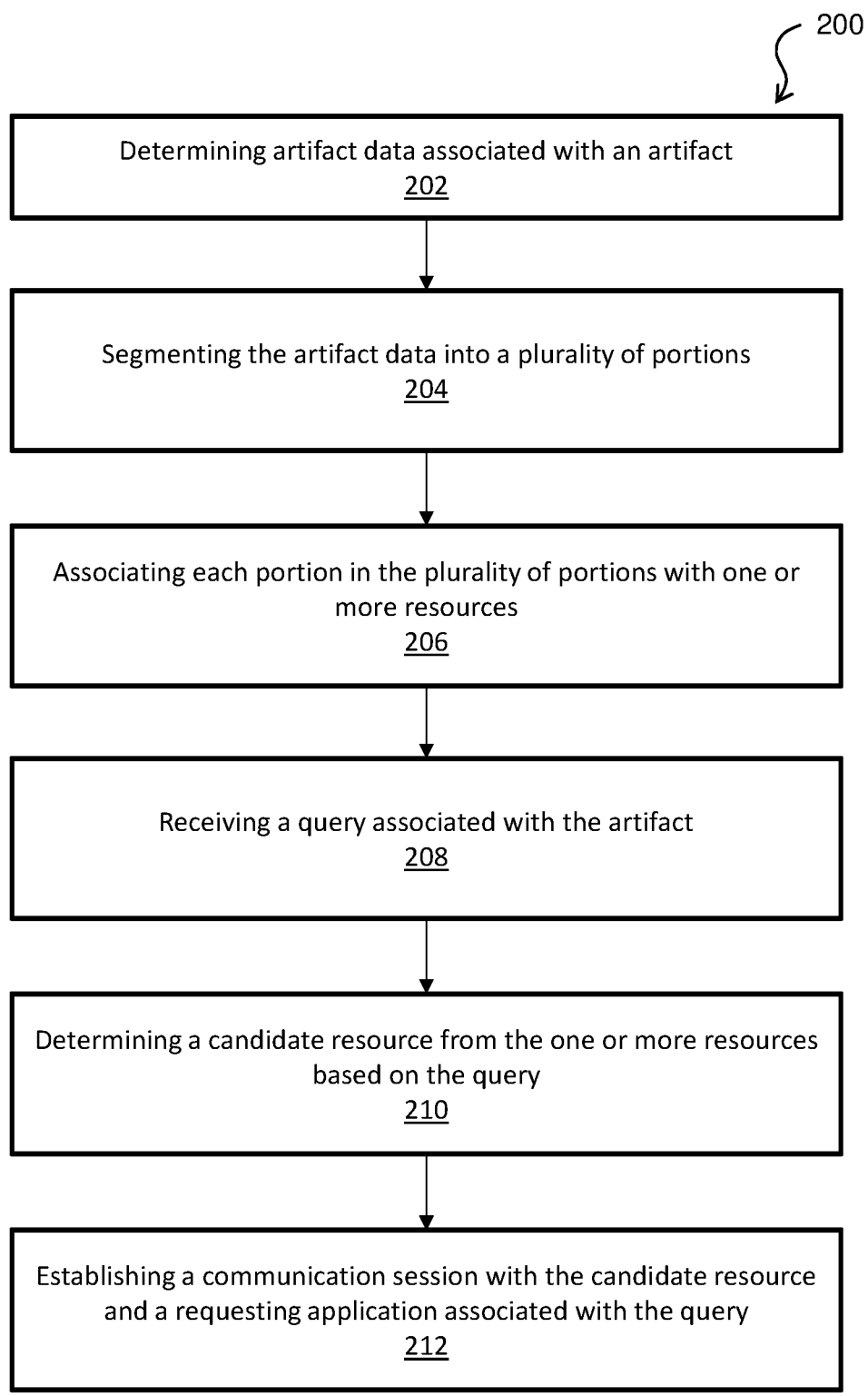
FIG. 2 depicts a flow diagram of a method for providing a pseudo real-time communication session according to one or more embodiments of the invention.

FIG. 2 depicts a flow diagram of a method for providing a pseudo real-time communication session according to one or more embodiments of the invention. The method 200 in the flow diagram can be executed utilizing the artifact analysis engine 102 (from FIG. 1). The method 200 includes determining artifact data associated with an artifact, as shown in block 202. The artifact data can be any data such as audio, video, text (both structured and unstructured), and artifact materials such as slides, figures, and the like. At block 204, the method 200 includes segmenting the artifact data into a plurality of portions. The portions of the artifact can be segmented by, for example, slide page in a presentation or by time frames in a video. The method 200, at block 206, includes associating each portion in the plurality of portions with one or more resources. The resources described herein can be include, but are not limited to, contributors, presenters, authors, and audience members who may have asked a question which was answered in a question and answer session. Also, the method 200 includes receiving a query associated with the artifact, as shown at block 208. The query is analyzed to determine what the question or request is asking and then matched to one or more portions of the presentation. At block 210, the method 200 includes determining a candidate resource from the one or more resources based on the query. This resource can be determine from a contribution score or the like that can show the level of understanding related to the query. And at block 212, the method 200 includes establishing a communication session with the candidate resource and a requesting application associated with the query.

Additional processes may also be included. It should be understood that the processes depicted in FIG. 2 represent illustrations, and that other processes may be added or existing processes may be removed, modified, or rearranged without departing from the scope and spirit of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
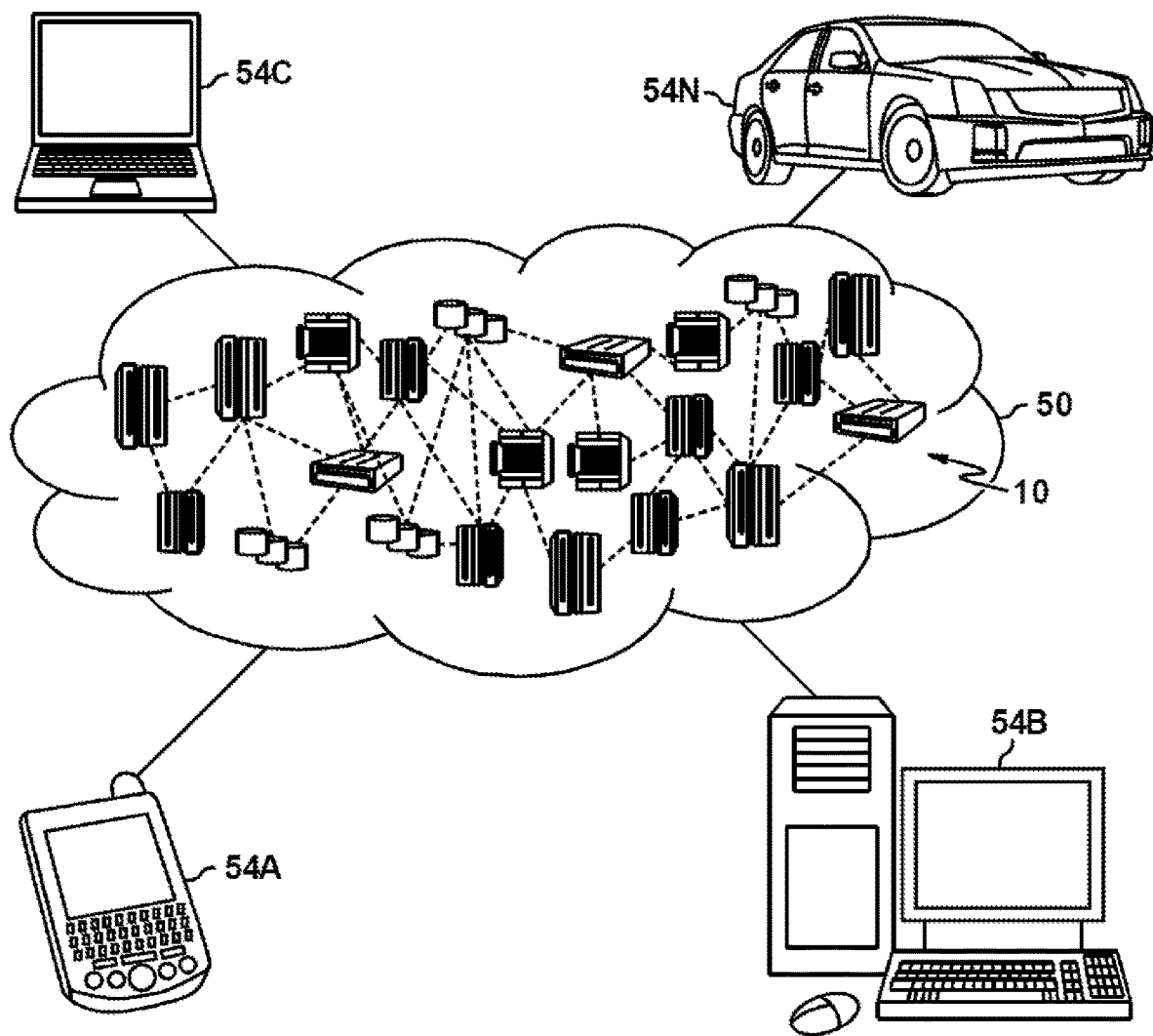
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a pseudo real time communication session 96.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node, such as the cloud computing nodes 10 (from FIG. 3). Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining artifact data associated with an artifact;
   segmenting the artifact data into a plurality of portions, wherein segmenting the artifact data into the plurality of portions comprises:
      tokenizing the artifact data into a plurality of tokens;
      determining one or more concepts for each token in the plurality of tokens; and
      annotating each token with the one or more concepts, wherein the one or more portions are segmented based at least in part on an associated one or more concepts;
   associating each portion in the plurality of portions with one or more resources, wherein associating each portion in the plurality of portions with one or more resources comprises:
      determining one or more contributors with each token in the plurality of tokens;
      generating a contribution score for each contributor of the one or more contributors; and
      associating the one or more resources with each portion in the plurality of portions based at least in part on the contribution score;
   receiving a query associated with the artifact;
   determining a candidate resource from the one or more resources based on the query; and
   initializing a communication session with the candidate resource and a requesting application associated with the query.

2. The computer-implemented method of claim 1, wherein the candidate resources comprises a highest contribution score.

3. The computer-implemented method of claim 1, wherein determining the candidate resource from the one or more resources based on the query comprises:
   determining one or more query concepts from the query;
   determining a relevancy score for each portion in the plurality of portions based on the one or more query concepts and the one or more concepts associated with each portion;
   determining a relevant portion from the plurality of portions having a highest relevance score; and
   determining the candidate resource from the one or more resources associated with the relevant portion.

4. The computer implemented method of claim 1, wherein the candidate resource comprises a first candidate resource; and further comprising:
   determining a second candidate resource from the one or more resources based on the query;
   determining a first availability score for the first candidate resource;
   determining a second availability score for the second candidate resource; and
   establishing the communication session with the second candidate resource based on the second availability score exceeding the first availability score.

5. The computer-implemented method of claim 1, wherein the candidate resource comprises a contributor associated with the artifact.

6. The computer-implemented method of claim 1, wherein the candidate resource comprises a text transcript associated with the artifact.

7. The computer-implemented method of claim 1, wherein the artifact data comprises one or more of audio data, video data, and textual data.

8. A system comprising:
   a memory having computer readable instructions; and
   one or more processors for executing the computer readable instructions, the computer readable instructions controlling the one or more processors to perform operations comprising:
      determining artifact data associated with an artifact;
      segmenting the artifact data into a plurality of portions, wherein segmenting the artifact data into the plurality of portions comprises:
         tokenizing the artifact data into a plurality of tokens;
         determining one or more concepts for each token in the plurality of tokens; and
         annotating each token with the one or more concepts, wherein the one or more portions are segmented based at least in part on an associated one or more concepts;
      associating each portion in the plurality of portions with one or more resources, wherein associating each portion in the plurality of portions with one or more resources comprises:
         determining one or more contributors with each token in the plurality of tokens;
         generating a contribution score for each contributor of the one or more contributors;
         associating the one or more resources with each portion in the plurality of portions based at least in part on the contribution score;
      receiving a query associated with the artifact;
      determining a candidate resource from the one or more resources based on the query; and
      initializing a communication session with the candidate resource and a requesting application associated with the query.

9. The system of claim 8, wherein the candidate resources comprises a highest contribution score.

10. The system of claim 8, wherein determining the candidate resource from the one or more resources based on the query comprises:
    determining one or more query concepts from the query;
    determining a relevancy score for each portion in the plurality of portions based on the one or more query concepts and the one or more concepts associated with each portion;
    determining a relevant portion from the plurality of portions having a highest relevance score; and
    determining the candidate resource from the one or more resources associated with the relevant portion.

11. A computer program product comprising a computer readable storage medium having program instructions embodied therewith, the program instructions executable by a processor to cause the processor to perform operations comprising:
    determining artifact data associated with an artifact;
    segmenting the artifact data into a plurality of portions, wherein segmenting the artifact data into the plurality of portions comprises:
       tokenizing the artifact data into a plurality of tokens;
       determining one or more concepts for each token in the plurality of tokens;
       annotating each token with the one or more concepts, wherein the one or more portions are segmented based at least in part on an associated one or more concepts;
    associating each portion in the plurality of portions with one or more resources, wherein associating each portion in the plurality of portions with one or more resources comprises:
       determining one or more contributors with each token in the plurality of tokens;
       generating a contribution score for each contributor of the one or more contributors;
    associating the one or more resources with each portion in the plurality of portions based at least in part on the contribution score;
    receiving a query associated with the artifact;
    determining a candidate resource from the one or more resources based on the query; and
    initializing a communication session with the candidate resource and a requesting application associated with the query.

12. The computer program product of claim 11, wherein the candidate resources comprises a highest contribution score.

13. The computer program product of claim 11, wherein determining the candidate resource from the one or more resources based on the query comprises:
    determining one or more query concepts from the query;
    determining a relevancy score for each portion in the plurality of portions based on the one or more query concepts and the one or more concepts associated with each portion;
    determining a relevant portion from the plurality of portions having a highest relevance score; and
    determining the candidate resource from the one or more resources associated with the relevant portion.

14. The computer program product of claim 11, wherein the candidate resource comprises a first candidate resource; and further comprising:
- determining a second candidate resource from the one or more resources based on the query;
- determining a first availability score for the first candidate resource;
- determining a second availability score for the second candidate resource;
- establishing the communication session with the second candidate resource based on the second availability score exceeding the first availability score.

* * * * *